United States Patent
Bailbe et al.

(10) Patent No.: US 8,660,711 B2
(45) Date of Patent: Feb. 25, 2014

(54) METHOD AND SYSTEM FOR DEACTIVATING A STEERING SYSTEM OF AN AIRCRAFT'S FRONT LANDING GEAR

(75) Inventors: Noelle Bailbe, Leguevin (FR); Xavier Lamoussiere, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 750 days.

(21) Appl. No.: 12/742,051

(22) PCT Filed: Nov. 7, 2008

(86) PCT No.: PCT/FR2008/052019
§ 371 (c)(1),
(2), (4) Date: Nov. 3, 2010

(87) PCT Pub. No.: WO2009/068801
PCT Pub. Date: Jun. 4, 2009

(65) Prior Publication Data
US 2011/0046819 A1    Feb. 24, 2011

(30) Foreign Application Priority Data
Nov. 13, 2007 (FR) ..................................... 07 58993

(51) Int. Cl.
*B64C 25/50* (2006.01)
*B62D 6/00* (2006.01)

(52) U.S. Cl.
USPC ................................................. 701/3; 701/41

(58) Field of Classification Search
USPC ..................... 701/3, 36, 41, 117, 120; 244/50; 340/958, 960
See application file for complete search history.

(56) References Cited

U.S. PATENT DOCUMENTS

| 2,943,867 | A | | 7/1960 | Hartel | |
|---|---|---|---|---|---|
| 3,885,759 | A | * | 5/1975 | Lear | 244/50 |
| 5,513,821 | A | | 5/1996 | Ralph | |
| 5,680,125 | A | * | 10/1997 | Elfstrom et al. | 340/958 |
| 6,928,363 | B2 | * | 8/2005 | Sankrithi | 701/120 |
| 8,094,042 | B2 | * | 1/2012 | Read et al. | 340/960 |
| 2003/0165375 | A1 | * | 9/2003 | Johansson | 414/427 |
| 2004/0059497 | A1 | | 3/2004 | Sankrithi | |
| 2005/0196256 | A1 | * | 9/2005 | Rodenkirch et al. | 414/426 |
| 2008/0203217 | A1 | * | 8/2008 | Frank | 244/50 |
| 2009/0040072 | A1 | * | 2/2009 | Read et al. | 340/960 |
| 2011/0259995 | A1 | * | 10/2011 | Frings et al. | 244/50 |

FOREIGN PATENT DOCUMENTS

GB        879276 A     10/1961

OTHER PUBLICATIONS

French Search Report and Written Opinion dated Jun. 5, 2008.

\* cited by examiner

*Primary Examiner* — Jason Holloway
(74) *Attorney, Agent, or Firm* — Greer, Burns & Crain Ltd.

(57) ABSTRACT

A method for deactivating a steering system of a front landing gear of an aircraft, including detecting an activated status of the steering system, detecting a pilot control unit in neutral position, detecting towing conditions of the aircraft, detecting a rotational movement of the nose gear, and deactivating the steering system when operations to are verified. The disclosed embodiments also concern a system for implementing this method.

16 Claims, 2 Drawing Sheets

METHOD AND SYSTEM FOR DEACTIVATING A STEERING SYSTEM OF AN AIRCRAFT'S FRONT LANDING GEAR

CROSS-REFERENCE TO RELATED APPLICATIONS

This application is the National Stage of International Application No. PCT/FR2008/052019 International Filing Date, 7 Nov. 2008, which designated the United States of America, and which International Application was published under PCT Article 21 (s) as WO Publication No. WO2009/068801 A2 and which claims priority from, and the benefit of, French Application No. 200758993 filed on 13 Nov. 2007, disclosures of which are incorporated herein by reference in their entireties.

The aspects of the disclosed embodiments concern a method for deactivating the steering system of an aircraft's front landing gear when the aircraft is towed in an airport parking area. The aspects of the disclosed embodiments also concern a system implementing this method.

The disclosed embodiments find applications in the field of aeronautics and, in particular, in the field of monitoring the condition of landing gear steering systems, when the aircraft is on the ground.

BACKGROUND

In certain cases, when an aircraft is on the ground in an airport parking area for instance, the aircraft needs to be moved. For example, it can be necessary to move an aircraft if it has broken down, or to move the aircraft out of the parking area, or to reverse it, etc.

It is known to use a tow vehicle, also called a tractor, which tows the aircraft to move it to a specific location, to move an aircraft on the ground. During these towing phases, the aircraft is pulled or pushed by a tow vehicle connected to the aircraft's front landing gear, more simply called the nose gear.

An aircraft's nose gear can be oriented to the right or the left to allow the aircraft's movement along curves to the right or left, with respect to a longitudinal axis of the aircraft. On certain aircraft this nose gear orientation is obtained by means of a steering system. This steering system comprises a hydraulic system associated to a command prepared by a computer, from pilot inputs via an interface. The power made available to the steering system is supplied by the hydraulic system, which can also power other systems of the aircraft. This steering system can be either activated or deactivated.

When the steering system is activated the nose gear is controlled by the pilot via a pilot control unit installed in the aircraft cockpit. When the steering system is deactivated the nose gear is free, i.e. it is no longer controlled and can therefore follow the movements imposed by an external element, e.g. towing by a vehicle.

Generally, activating and deactivating the steering system is controlled by means of a control device located outside the aircraft.

The control device for the nose gear steering system can be, for instance, a lever or any other control located on the gear itself or near to the gear. This control device, subsequently called lever, comprises an electrical switch that, in an active position (or closed position), allows the nose gear steering system to be activated and, in a non-active position (open position), allows said steering system to be deactivated.

When the tractor tows the aircraft, it is necessary for the steering control to be inactive, i.e. that the steering system is deactivated, such that the nose gear is free in rotation. In effect, if the nose gear control is active, i.e. if the steering system is not deactivated, then said steering system seeks to slave the gear to its neutral position, or initial position, i.e. a position where its angle of rotation is zero. As a result, when a tractor tows the aircraft, the steering system tries to counter the movements imposed by the tractor, in particular in bends, which forces the gear's steering system and can lead to certain elements of the aircraft being damaged. The damaged elements can be structural parts of the nose gear or a hydraulic element of the nose gear steering system or any other part used in the nose gear control chain.

In certain aircraft, the gear's steering system is activated or deactivated by an operator on the ground who places the lever forming the control device in an open or closed position. This lever can be mounted on a unit fitted on the aircraft's nose gear, or close to the nose gear.

In operation without towing the lever is in the closed position, thus allowing the pilot to control the gear's steering system. The lever is kept in its closed position for the entire period of the aircraft's flight and for the entire period when the aircraft moves under its own power on the ground.

When towing must be carried out, the operator on the ground must move the lever to its open position in order to deactivate the gear's steering system. The change in the steering system's status (activated or deactivated) is controlled solely by the operator on the ground. As a safety measure, some control devices comprise a locking element that must be put in place in order to lock the control device in its open or closed position. For example, this locking element is a pin inserted into a slot to make sure that the lever remains in its open or closed position.

However, if the operator on the ground forgets to change the lever's position, if the lever remains blocked in its closed position, or if the operator forgets to lock the lever by means of the safety pin and the lever returns to its closed position during the towing phase, then the gear's steering system operates as if it was activated, which gives rise to risks of the nose gear or steering system being damaged, as explained earlier. Whatever the reason, reactivation or non-deactivation of the gear's steering system, the fact that said steering system is in an activated mode when the aircraft is being towed can be the cause of significant damage to the aircraft.

SUMMARY

The purpose of the disclosed embodiments is to remedy the drawbacks of the techniques described previously. To this end, the disclosed embodiments propose a method allowing an aircraft's nose gear steering system to be deactivated automatically when certain conditions are met, these conditions leading to an assumption that the aircraft is being towed. For this, the method of the disclosed embodiments propose detecting a rotational movement of the nose gear when the aircraft is under towing conditions. In effect if, under towing conditions, the method detects that the nose gear is in rotation, then it is assumed that this rotational movement is caused by a tow vehicle. The disclosed embodiments thus propose to deactivate the steering system so as to avoid any damage.

More precisely, the disclosed embodiments concern a method for deactivating a steering system of a front landing gear of an aircraft, characterized in that it comprises operations for:

(a) detecting an activated status of the steering system,
(b) detecting a pilot control unit in neutral position,
(c) detecting towing conditions of the aircraft,
(d) detecting a divergent rotational movement of the nose gear, and (e) deactivating the steering system when operations (a) to (d) are verified.

The disclosed embodiments can comprise one or more of the following characteristics:

the steering system is deactivated when operations (a) to (d) are detected during a period of time greater than a pre-defined threshold period of time.

the towing conditions comprise a positioning of the aircraft on the ground.

the towing conditions comprise a speed of movement for the aircraft that is less than a pre-defined value.

a rotational movement of the nose gear is detected when an angle of rotation of said gear is greater than a pre-defined threshold angle and it differs from 0°.

a rotational movement of the nose gear is detected when a speed of rotation of said gear is greater than a pre-defined threshold speed and the movement diverges from a centered position of said gear.

a rotational movement of the landing gear is detected when an absolute value of an angle of rotation of the nose gear is greater than a pre-defined threshold value.

The disclosed embodiments also concern a system for implementing the method described above. This deactivation system is characterized by the fact that it comprises at least one angular position sensor supplying angular data, and a computer to determine, under towing conditions and based on angular data, the existence of a rotational movement of the nose gear and to command the deactivation of the steering system.

The system of the disclosed embodiments can comprise one or more of the following characteristics:

it comprises a logic circuit able to control an activation or deactivation status of the steering system.

the logic circuit comprises an input receiving information on the nose gear's angular position, an input receiving information from the pilot control unit, an input receiving information relating to the steering system's status, and an input receiving information relating to the aircraft's towing conditions.

The disclosed embodiments also concern an aircraft in which the method of the disclosed embodiments is implemented.

DETAILED DESCRIPTION

Figure 1:
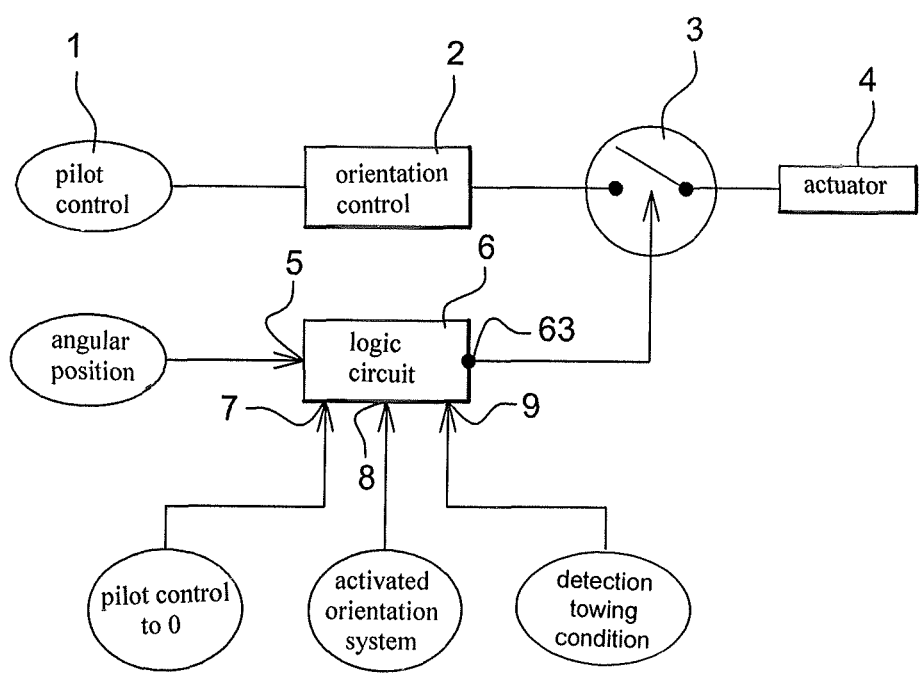
FIG. 1 represents a functional chart of the method of the disclosed embodiments.

In most aircraft, the nose gear is controlled, for both its lowering and its orientation, by means of a hydraulic circuit, itself controlled by the pilot through a control unit located in the cockpit and called the pilot control unit.

As previously explained, the aircraft's steering system can be activated or deactivated by means of a control device. This control device can be in the form of a lever installed in a unit fixed on the nose gear or close to the nose gear. This lever allows a switch to be changed from a closed position to an open position. When the aircraft is ready to be towed by a tow vehicle, the operator on the ground must move the lever from its closed position to its open position so that the steering system is placed in a deactivated state. When it is in this deactivated state, the steering system is free, i.e. it is no longer controlled by the pilot control unit. The aircraft can then undergo towing without risk of damage.

The disclosed embodiments propose a method that allows the gear's steering system to be deactivated when this steering system is activated while a rotational movement of the gear and towing conditions have been detected. The disclosed embodiments therefore take specific conditions due to the towing of the aircraft into account. These towing conditions can be related to the status of the steering system or related to the status of the aircraft itself. The essential towing condition related to the status of the steering system is:

the pilot control relating to the steering condition is in the neutral position in the aircraft's cockpit, which means that the pilot intends being in deactivated mode.

The essential towing conditions related to the aircraft itself are as follows:

the aircraft is on the ground (as opposed to an aircraft in flight);

the aircraft's speed is low, i.e. less than a pre-defined speed value.

The towing conditions therefore correspond to the fact that the aircraft must have landed, that it must be stopped or almost stopped and that the pilot must not be in the process of ordering a rotation of the nose gear.

It should be noted that other towing conditions can also be taken into account according, for instance, to the type of aircraft in question, external conditions of the airport where the aircraft has landed, etc.

The method of the disclosed embodiments considers that, under the towing conditions mentioned earlier, if a rotational movement of the gear is detected, this means that the aircraft is in the process of being towed. Consequently, if the steering system is detected as being activated, it is necessary to deactivate said steering system.

In the method of the disclosed embodiments, a rotational movement is considered to exist when the nose gear's angle of rotation is greater than a pre-defined threshold value and this value of the angle differs from 0°. A rotational movement is detected when a variation in the angle of rotation is above a certain value, in the case where this angle diverges from the centered position of the gear. The centered position of the gear is considered to correspond to the position of the nose gear when it is aligned along the longitudinal axis of the aircraft.

In other words, the method of the disclosed embodiments proposes automatically deactivating the gear's steering system when at least the following four criteria are met:

steering system is in its activated state, no command for the gear's steering system has been issued by the pilot (the pilot control is at zero), towing conditions of the aircraft have been detected, and a rotational movement of the gear has been detected, this movement diverging from the centered position of the gear.

The various criteria described previously for determining whether the steering system must be deactivated are taken into account if they are confirmed during a certain length of time. In other words, the method of the disclosed embodiments chooses to take the various criteria into account when these have been confirmed over a certain period of time, i.e. a period greater than a pre-defined threshold period of time. This minimum period of time is chosen so as to make the method secure and, in this way, avoid any inappropriate detection of an activated state.

Figure 2:
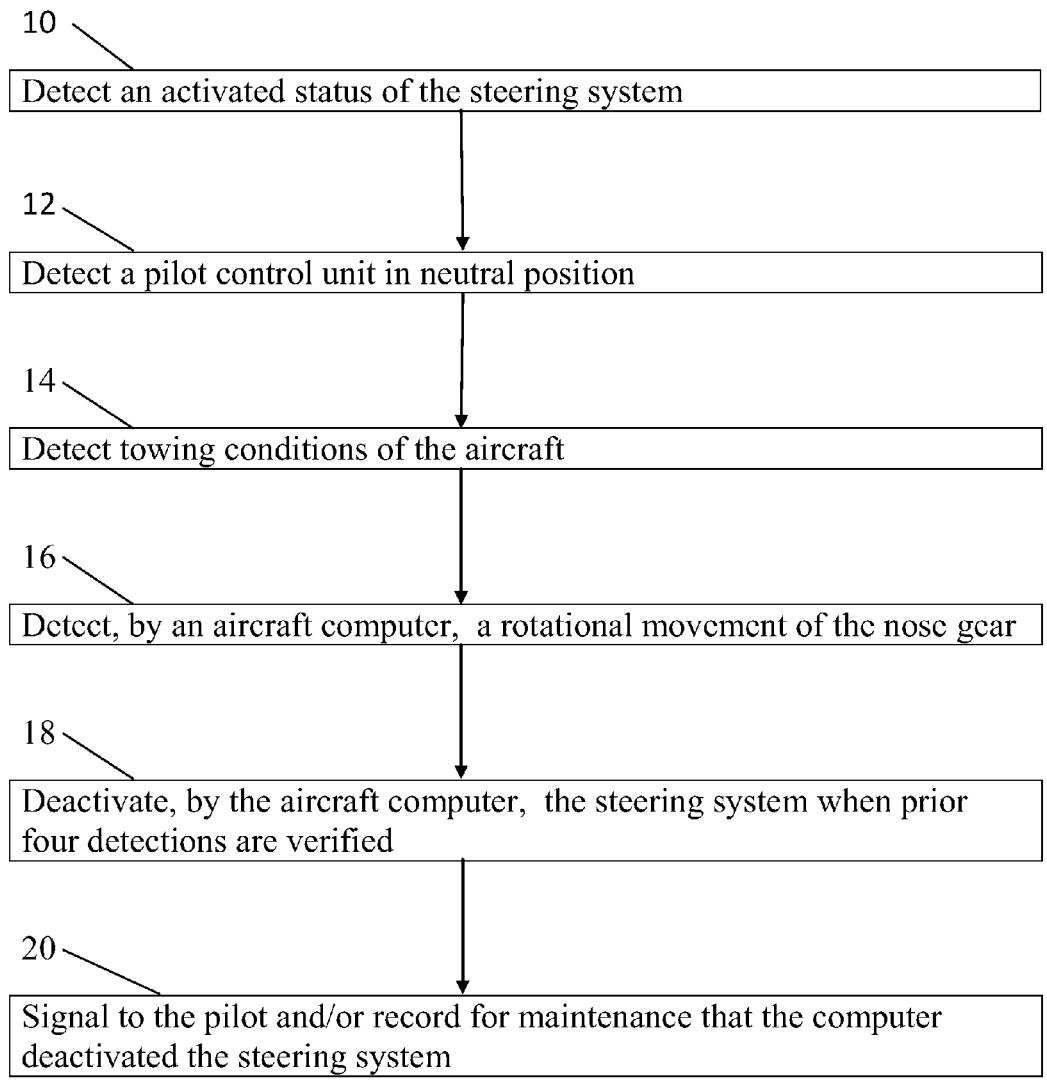
FIG. 2 is a flow chart of the steps of the method of the disclosed embodiments.

In other words, the method of the disclosed embodiments proposes to deactivate the steering system when:

the latter has been detected as active (step 10 FIG. 2), i.e. the hydraulic circuit of the gear control is pressurized whereas the pilot control is at zero (step 12), towing conditions have been detected (step 14), a minimum variation of the angle of rotation, with an angle that differs from the set-point at zero, has been detected (step 16), and all these conditions have been confirmed over a certain period of time. When all these conditions, at least, are confirmed, the nose gear's steering system is deactivated (step 18) by depressurizing the hydraulic circuit.

It should be noted, however, that the period of time during which these various conditions must be confirmed can be variable depending on the aircraft in question and, in particular, the dynamics of this aircraft's steering system.

The method of the disclosed embodiments is shown, in a functional form, in the FIGURE. More precisely, the FIG. 1 represents a functional diagram showing the way in which the various criteria are taken into account, in the method of the disclosed embodiments, to determine whether the gear's steering system must be deactivated. FIG. 1 shows schematically the steering system controlled by means of pilot control 1. It also shows a means of managing the deactivation 6 of the steering system. This managing means 6 is a logic circuit 6 receiving the following criteria at its inputs:

input 5 receives the angular position of the nose gear (step 16), input 7 receives the information of pilot control at zero (step 12), the pilot control being at zero when the pilot considers that, in the situation in question, it is not up to him or her to control the gear's orientation, input 8 receives information relating to the steering system's status (activated or deactivated)(step 10), and input 9 receives information relating to the towing conditions (step 14).

The deactivation logic 6 can be implemented by one of the aircraft's computers. In an aircraft architecture example, the computer is a BSCU (Brakes and Steering Control Unit) computer. The deactivation logic 6 receives the various information, mentioned previously, in the form of binary data. If each of these items of information is 1, then the deactivation circuit 6 issues a signal, for example a bit set to 1, on its output 63.

The deactivation logic 6 is connected by its output 63 to a switch 3. This switch 3 is connected between the steering control system 2 and an actuator 4, fitted, for example, in parallel with the manual control lever. In the architecture example mentioned previously, the control of the steering system, the logic circuit and the control of a solenoid valve, located upstream of the hydraulic circuit, are software elements of the BSCU computer. The deactivation of the steering system, whether it is commanded in a normal way by the system, is due to the lever on the gear changing to open position, or is due to the deactivation logic, is always achieved by opening this solenoid valve.

Switch 3 is controlled by the signal from the output 63 of the deactivation logic 6. When the deactivation logic 6 sends a first signal, for example 0, to switch 3, this closes. While switch 3 is closed, the steering system is activated; it is controlled from the pilot control unit 1 and the steering control 2. When the deactivation logic 6 sends a second signal, for example 1, to switch 3, this opens. While switch 3 is open, the steering system is deactivated. The opening of switch 3 drives an actuator 4. This actuator 4 deactivates the steering system by depressurizing the hydraulic circuit through a solenoid valve command.

According to the disclosed embodiments, the various criteria taken into account for the deactivation decision are determined by the aircraft computer, with regard to threshold values.

In particular, a rotational movement of the nose gear is detected (step 16) when the gear's angle of rotation has a minimum variation. This variation in the angle of rotation can be determined from the angle of rotation itself. Preferably, it is determined from the nose gear's speed of rotation, with regard to a pre-defined threshold speed. This threshold speed value is determined by calculation, depending on the speed of rotation above which it is estimated there is a risk of damaging the gear's elements. In this case, the rotation threshold is given in degrees per second.

The criterion related to the aircraft's angle of rotation takes into account not only the value of the angle of rotation but also its direction. In effect, for this criterion to be considered as one of the criteria requiring the deactivation of the steering system, it is necessary for the angle of rotation to be divergent, i.e. that it differs from zero. This additional condition makes it possible to avoid detecting cases where the pilot commands a return to neutral after making a turn.

The criterion relating to the towing conditions can take various forms, depending on the aircraft in question and/or the circumstances. These towing conditions can be the fact that the aircraft is on the ground, or that the aircraft has a speed greater than a pre-defined threshold speed, etc. These conditions can be chosen separately or combined together.

In an embodiment of the disclosed embodiments, in order to avoid an inappropriate detection when the nose gear turns slightly about its neutral position (in the specification of the steering system), it is possible to add an additional condition relating to the absolute value of the nose gear's angle of rotation with respect to zero. This condition provides precision with regard to the detection of a rotational movement of the aircraft. This condition is as follows: if the absolute value of the nose gear's angle of rotation is greater than a certain threshold, and all the criteria mentioned previously are verified, then the steering system must be deactivated.

In an example of realization of the disclosed embodiments, a rotation threshold is chosen of 1 deg/s. In this example, the aircraft's threshold speed is chosen equal to 10 m/s. In this example, the steering system must be deactivated when the nose gear has a rotational movement greater than 1 deg/s and the plane speed is less than 10 m/s, the other conditions being, of course, fulfilled (pilot control at zero and steering system activated). In this same example, a time threshold, i.e. a value of the length of time during which the deactivation conditions must be confirmed, of 0.5 seconds is chosen.

In an embodiment of the disclosed embodiments, the disclosed embodiments propose that each detection of an incorrect deactivation is signaled to the pilot and/or recorded for maintenance (step 20) in order to enable a repair or a more detailed check of the steering system's control device. In effect, if the steering system has been deactivated in accordance with the method of the disclosed embodiments, that means that the system was not deactivated beforehand and, consequently, either the operator on the ground has not carried out this deactivation, or the manual control device is defective.

The method of the disclosed embodiments as described above is implemented by an automatic deactivation system. This deactivation system comprises at least one angular position sensor. This sensor is able to provide angular data relating to the position of the nose gear. Such a sensor is generally an integral part of aircrafts' steering devices. This sensor is linked to a computer, for example to the BSCU computer, which has the job, in particular, of controlling the front landing gear's orientation. In the disclosed embodiments, this sensor comprises a logic circuit 3 making it possible to control the activation or deactivation status of the steering system based on various information described earlier. This logic circuit receives information measured and/or detected by various means installed on the aircraft and uses this information to determine a steering system control malfunction. Thus, in the disclosed embodiments, a steering system monitoring function is added to the computer in charge of controlling the steering system. Thus, in the disclosed embodiments, the computer is able to determine the existence of a rotational movement of the nose gear and command the deactivation of said gear's steering system.

The invention claimed is:

1. A method for automatically deactivating a steering system of a front landing gear of an aircraft when said aircraft is being towed on the ground, the steering system being controlled by a hydraulic circuit controlled by a pilot of the aircraft through a pilot control unit located in a cockpit of the aircraft, comprising the steps of:
   (a) detecting an activated status of the steering system,
   (b) detecting the pilot control unit as being in a neutral position,
   (c) detecting one or more towing conditions of the aircraft,
   (d) detecting, by an aircraft computer, a rotational movement of the nose gear, and
   (e) deactivating, by the aircraft computer, the steering system by depressurizing the hydraulic system when steps (a) to (d) are verified.

2. A method according to claim 1, wherein the steering system is deactivated when operations (a) to (d) are detected during a period of time greater than a pre-defined threshold period of time.

3. A method according to claim 1, wherein the towing conditions comprise a positioning of the aircraft on the ground.

4. A method according claim 1, wherein the towing conditions comprise a speed of movement for the aircraft that is less than a pre-defined value.

5. A method according to claim 1, wherein a rotational movement of the nose gear is detected when an angle of rotation of said gear is greater than a pre-defined threshold angle and it differs from 0°.

6. A method according to claim 1, wherein a rotational movement of the nose gear is detected when a speed of rotation of said gear is greater than a pre-defined threshold speed and the movement diverges from a centered position of said gear.

7. A system for automatically deactivating a steering system of a front landing gear of an aircraft when said aircraft is being towed on the ground, the aircraft including a manually operated nose gear steering system lever located on or near the front landing gear which is operable to activate and deactivate the steering system,
   wherein the system comprises:
      at least one angular position sensor supplying angular data,
      a computer configured to determine, under towing conditions and based on angular data, the existence of a rotational movement of the nose gear and further configured to command the deactivation of the steering system, and
      a switch arranged in parallel with the nose gear steering system lever operable by the computer and configured to activate and deactivate the steering system.

8. A system according to claim 7, wherein the system comprises a logic circuit able to control an activation or deactivation status of the steering system.

9. A system according to claim 8, wherein the logic circuit comprises:
   an input receiving information on the nose gear's angular position,
   an input receiving pilot control unit information,
   an input receiving information relating to the steering system's status, and
   an input receiving information relating to the aircraft's towing conditions.

10. An aircraft, wherein it comprises means implementing the method according to claim 1.

11. A method for automatically deactivating a steering system of a front landing gear of an aircraft when said aircraft is being towed on the ground, the steering system being controlled by a hydraulic circuit controlled by a pilot of the aircraft through a pilot control unit located in a cockpit of the aircraft, comprising the steps:
   (a) detecting an activated status of the steering system,
   (b) detecting the pilot control unit as being in a neutral position,
   (c) detecting one or more towing conditions of the aircraft,
   (d) detecting, by an aircraft computer, a rotational movement of the nose gear,
   (e) deactivating, by the aircraft computer, the steering system by depressurizing the hydraulic system when steps (a) to (d) are verified, and
   (f) at least one of signaling the pilot and recording the event of deactivating the steering system when the aircraft computer deactivates the steering system.

12. A method according to claim 11, wherein the steering system is deactivated when operations (a) to (d) are detected during a period of time greater than a pre-defined threshold period of time.

13. A method according to claim 11, wherein the towing conditions comprise a positioning of the aircraft on the ground.

14. A method according claim 11, wherein the towing conditions comprise a speed of movement for the aircraft that is less than a pre-defined value.

15. A method according to claim 11, wherein a rotational movement of the nose gear is detected when an angle of rotation of said gear is greater than a pre-defined threshold angle and it differs from 0°.

16. A method according to claim 11, wherein a rotational movement of the nose gear is detected when a speed of rotation of said gear is greater than a pre-defined threshold speed and the movement diverges from a centered position of said gear.

* * * * *